US006564508B1

(12) United States Patent
Buchan

(10) Patent No.: US 6,564,508 B1
(45) Date of Patent: May 20, 2003

(54) METHOD OF TREATING A PLANT OR CROP

(75) Inventor: Pieter Walter William Buchan, Randburg (ZA)

(73) Assignee: PPA Water Industries (Proprietary) Limited, Randburg (ZA)

(*) Notice: Subject to any disclaimer, the term of this patent is extended or adjusted under 35 U.S.C. 154(b) by 0 days.

(21) Appl. No.: 09/743,951

(22) PCT Filed: Jul. 12, 1999

(86) PCT No.: PCT/IB99/01267

§ 371 (c)(1),
(2), (4) Date: Mar. 12, 2001

(87) PCT Pub. No.: WO00/03598

PCT Pub. Date: Jan. 27, 2000

(30) Foreign Application Priority Data

Jul. 15, 1998 (ZA) ................................. 98/6283

(51) Int. Cl.[7] ............................ A01B 79/00; A01C 1/00
(52) U.S. Cl. ..................... 47/58.1; 47/1.5; 47/DIG. 11
(58) Field of Search ................. 47/58.1, 57.7, 47/89, DIG. 11, 1.5; 118/207

(56) References Cited

U.S. PATENT DOCUMENTS

| | | | | |
|---|---|---|---|---|
| 3,768,201 A | * | 10/1973 | Yoo ................................ | 47/16 |
| 4,192,763 A | * | 3/1980 | Buchan ....................... | 252/187 |
| 4,766,113 A | * | 8/1988 | West et al. ................... | 514/187 |
| 4,842,729 A | * | 6/1989 | Buchan ..................... | 210/198.1 |
| 5,395,419 A | * | 3/1995 | Farone et al. ................. | 71/63 |
| 5,507,952 A | * | 4/1996 | Jaquess et al. .............. | 210/632 |
| 5,712,164 A | | 1/1998 | Coke | |

FOREIGN PATENT DOCUMENTS

| | | | | |
|---|---|---|---|---|
| EP | | 0162551 | 11/1985 | |
| EP | | 0214854 | 3/1987 | |
| EP | | 0489587 | 6/1992 | |
| JP | | 405076245 A | * 3/1993 | ............ A01G/9/00 |

OTHER PUBLICATIONS

Gupta and Chauhan, "Uptake and translocation of stable bleaching powder in cotton plants," *Indian Phytopath.* 39(3):427–431, 1986.
Hall, "Influence of calcium hypochlorite and genotype on plant production by bedded sweet potato roots," *Hortscience* 20(4):692–693, 1985.

* cited by examiner

Primary Examiner—Charles T. Jordan
Assistant Examiner—Andrea M. Valenti
(74) Attorney, Agent, or Firm—Klarquist Sparkman, LLP

(57) ABSTRACT

A method of treating a plant or crop includes exposing the plant or crop to an aqueous treatment stream which contains a wetting agent and calcium hypochlorite. Calcium hypochlorite is introduced into an aqueous flow stream to produce a treatment stream. The calcium hypochlorite produces hypochlorous acid, hypochlorite ions, calcium ions and hydroxyl ions and it is introduced so as to produce a treatment stream having a calcium hypochlorite concentration of between about 0.19 and 0.38 mM and a calcium ion concentration of between about 0.19 and 0.38 mM. The wetting agent is added to the water from which the flow stream is generated or to the flow stream or to the treatment stream and the plant or crop is exposed to the treatment stream.

18 Claims, 8 Drawing Sheets

Figure 1:
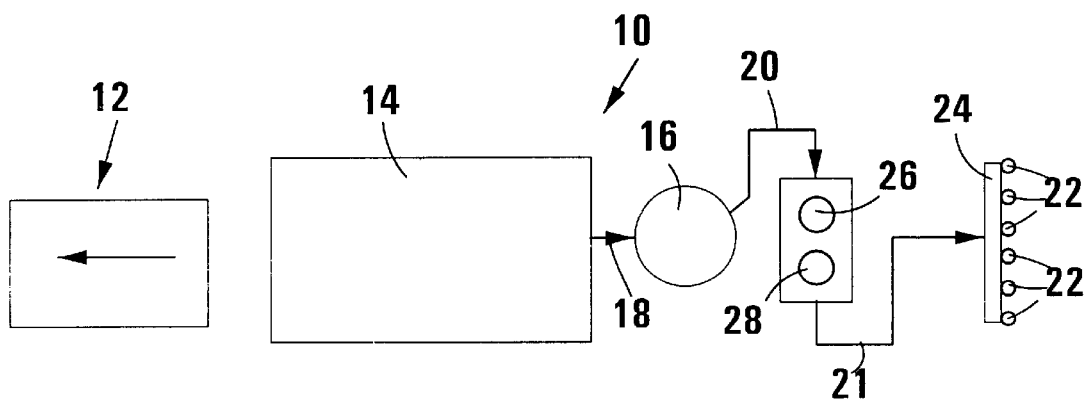
Figure 2:
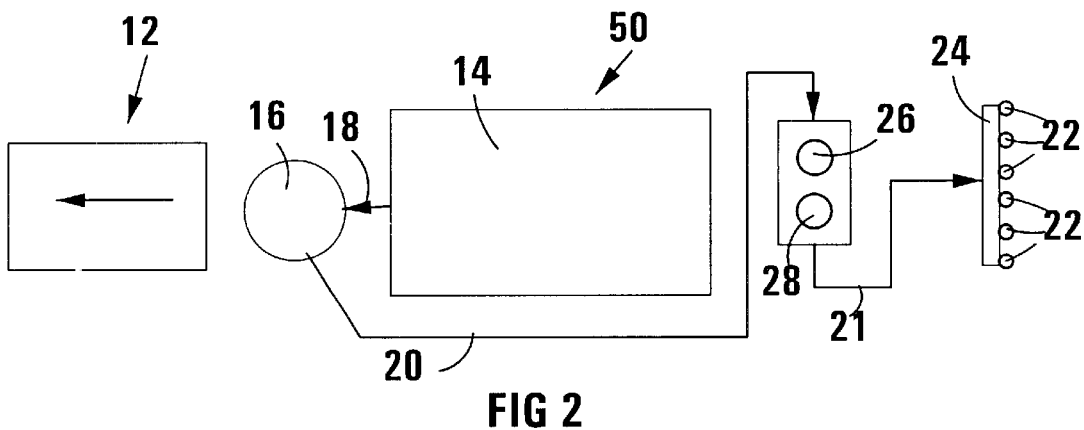
Figure 3:
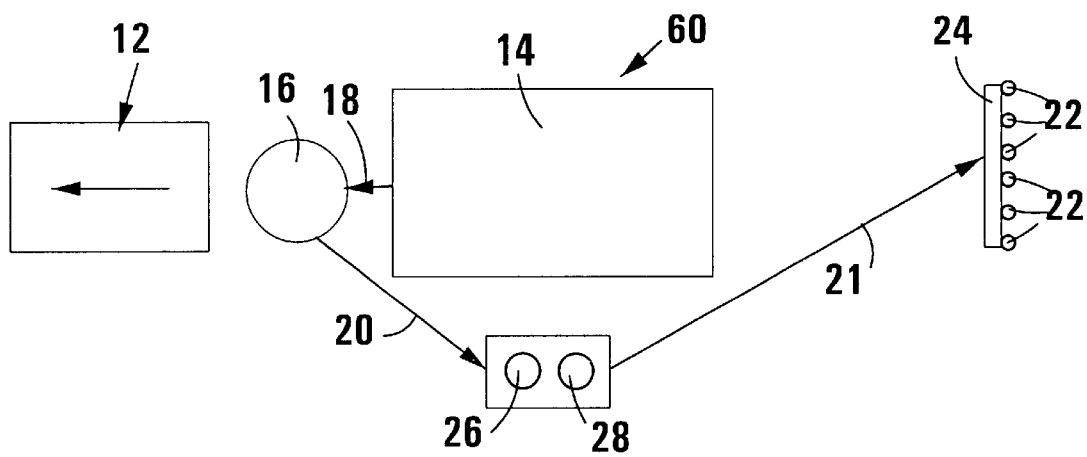

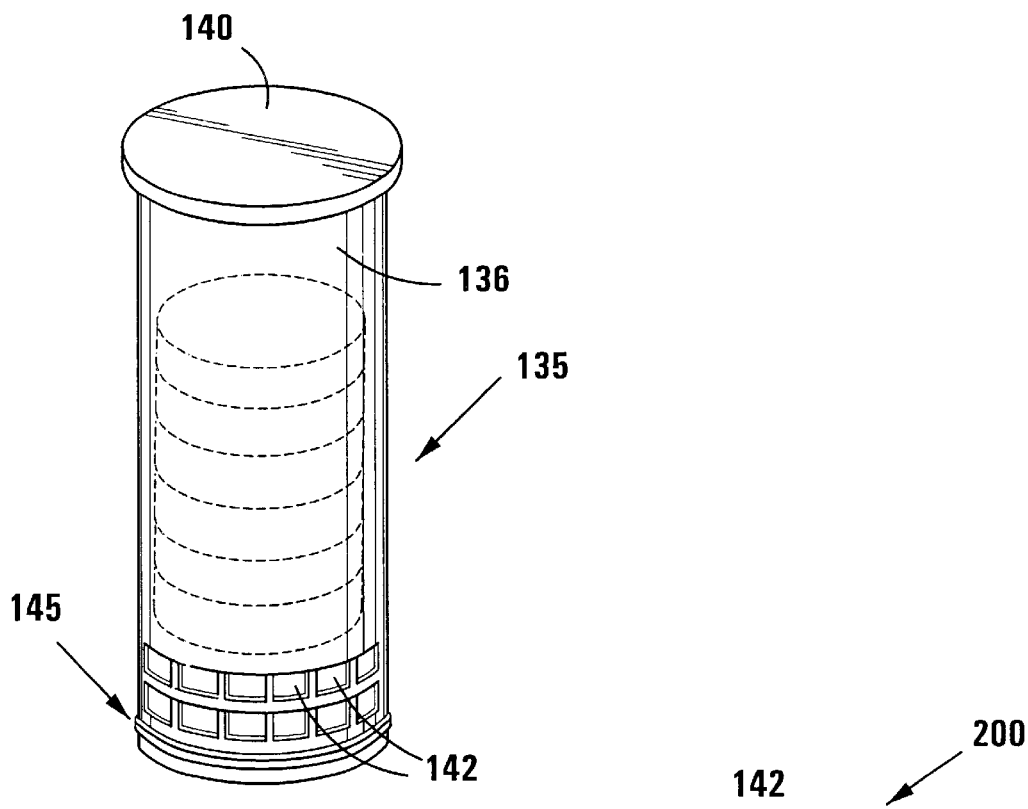
FIG 10
(PRIOR ART)
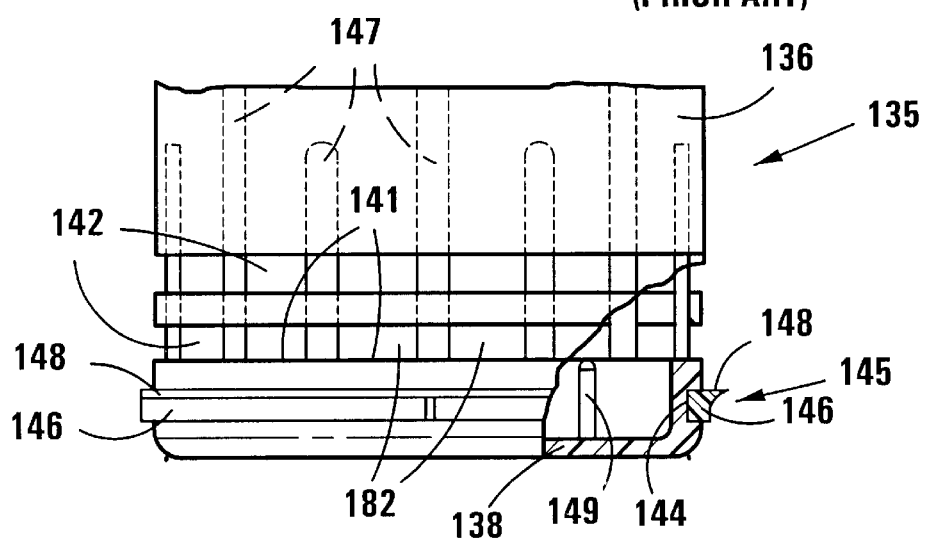
FIG 12
(PRIOR ART)
FIG 11
(PRIOR ART)

METHOD OF TREATING A PLANT OR CROP

THIS invention relates to a method of treating a plant or crop and to a treatment installation for the treatment of plants or crops.

Active chlorine in the form of hypochlorous acid, produced by the inorganic and organic hypochlorites and sources of active chlorine such as chlorine gas, sodium hypochlorite bleach (NaOCl), calcium hypochlorite $Ca(OCl)_2$ and the organic chlorinated isocyanurates (trichloro- and sodium dichloro S-triazines) have been used for over 50 years for post-harvest protection of produce and for the control of fungi and bacteria to prevent rot-spoilage. However, due to phytotoxicity, these compounds have generally not been applied in the spraying of live crops for the control of fungal and bacterial diseases by exploitation of the bactericidal and fungicidal properties of the active ingredient hypochlorous acid. In particular, calcium hypochlorite has generally not been used because of vagaries in dissolution and difficulty in the control of concentration. Calcium hypochlorite of the 65–70% product type contains sodium chloride, which is phytotoxic at the high concentration levels required to produce hypochlorous acid for the killing of fungi and bacteria.

This invention provides a method of using calcium hypochlorite in millimolar quantities for the treatment of plants or crops in the field. In accordance with the invention, the plant cell surface of the crop is exposed to millimolar quantities of non-ionized, covalently bonded, hypochlorous acid, calcium and hydroxide ions in an ideal physiologically balanced form. Because hypochlorous acid is unstable, dissipates and is readily destroyed by light, the method of the invention incorporates the use of a wetting agent to ensure complete contact between plant cell wall and active hypochlorous acid, calcium and hydroxide ions. The result of the treatment is epidermal fortification of the plant cell wall. The invention thus differs from known methods in which microbial organisms are killed by hypochlorous acid.

The invention thus provides a method of treating a plant or crop which includes the step of exposing the plant or crop to an aqueous medium which contains treatment agents which include at least one wetting agent, calcium cations and hypochlorous acid representing therefore a technique of non-exploitation or exclusion of the bactericidal and fungicidal properties of hypochlorous acid, the concentration of the calcium hypochlorite and the calcium being approximately 17.38–34.76 ppm and 7.6–15.2 ppm respectively.

To the best of the Applicant's knowledge, concentrations at this level, which are similar to the physiological concentration of calcium in plants, can only be dispensed in accordance with the method and apparatus of the invention.

Thus broadly, according to the invention, there is provided a method of treating a plant or crop which includes the step of exposing the plant or crop to an aqueous medium which contains treatment agents which include at least one wetting agent and calcium hypochlorite, the concentration of the calcium hypochlorite being between about 17.38 and 34.76 ppm.

The aqueous medium may be a treatment stream and exposing the plant or crop to the aqueous medium may include the steps of generating an aqueous flow stream from a source of water;

introducing calcium hypochlorite into the aqueous flow stream to produce a treatment stream, the calcium hypochlorite producing hypochlorous acid, hypochlorite ions, calcium ions and hydroxyl ions when it is introduced into the aqueous flow stream, and the calcium hypochlorite being introduced into the flow stream so as to produce a treatment stream having a calcium hypochlorite concentration of between about 17.38 and 34.76 ppm and a calcium concentration of between about 7.6–15.2 ppm;

adding the or each wetting agent optionally to the water from which the flow stream is generated or to the flow stream or to the treatment stream; and exposing the plant or crop to the treatment stream.

The calcium hypochlorite may be introduced into the aqueous flow stream so as to produce a treatment stream having a calcium hypochlorite concentration of between about 22.88 and 27.44 ppm and a calcium ion concentration of between about 10 and 12 ppm.

The method of the invention will typically be used for the treatment of growing crops. The plant or crop will thus typically be a growing crop. The crop may be selected from potatoes, stone fruit, apples, vines, onions, cucurbits such as pumpkins, melons and squashes, and leafy vegetables such as cabbage, lettuce, brussel sprouts and cauliflower or any crop which is prone to pathogenic or organism attack, including flowers.

The crop may thus be selected from potatoes, stone fruit, apples, vines, onions, cucurbits, leafy vegetables and flowers.

The calcium hypochlorite may be introduced into the aqueous flow stream by using an apparatus for controllably treating a liquid with a liquid treatment substance of the type described in the specification of U.S. Pat. No. 4,842,729.

The advantage of the use of an apparatus of the type described in U.S. Pat. No. 4,842,729 is that the time between contact of the water with the calcium hypochlorite, to form the required hydrolysis products and the time lag to contact the solution of hydrolysis products with the plant is so short that the beneficial ratio of hydrolysis products is retained. If calcium hypochlorite were merely mixed with water, this ionization ratio of hydrochlorous acid, hypochlorite ion and calcium hydroxide would fall into imbalance because of the instability and light sensitivity of hypochlorous acid, sedimentation of calcium hydroxide and because of side reaction of calcium hypochlorite with substances in the water stream. It is well documented that hypochlorous acid and hypochlorite form many defined and non-defined products with substances in water and the formation of these side reaction products is strictly time dependent. It is also well known that, to determine the chlorine demand of water, the tests are done over time periods from contact time to hours after contact time. The distance between the apparatus, e.g. the apparatus, and the sprays and the pressure of the water and the diameter of the conduit used are therefore selected to produce a short delay between formation of the solution and contact with the plant, as is described in further detail below.

The aqueous flow stream will typically be produced from municipal piped water or from irrigation water taken from a river, dam, borehole or the like.

The wetting agent, or surfactant, may be a silicone polyether wetting agent. It may, for example, be a silicone polyether copolymer and alcohol ethoxylate. These wetting agents are particularly suitable because they are not affected by the oxidizing properties of the treatment stream.

The aqueous medium may include about 0.005 to 0.05% and preferably about 0.01% of the wetting agent.

The method may thus include adding the wetting agent to the water from which the flow stream is generated or to the flow stream or to the treatment stream in an amount which is sufficient to produce a concentration of the wetting agent in the treatment stream of about 0.005–0.05% e.g preferably 0.01%. The wetting agent is necessary to enable the treatment stream to readily spread across the entire surface area of the plant which is being treated. The presence of a wetting agent, which allows the treatment stream to rapidly spread across the surface area of the plant so that the hypochlorous acid can rapidly exert its action before it dissipates, is an essential feature of the invention.

Exposing the plant or crop to the treatment stream may include the step of spraying the treatment stream onto the plant or crop with spraying means. The treatment stream may, for example, be sprayed onto the plant or crop via one or more spray nozzles.

The treatment substance may be introduced into the flow stream in an introduction zone of the flow stream.

The invention thus extends to a method of treating a plant or crop, the method including the steps of generating an aqueous flow stream from a source of water;

introducing calcium hypochlorite into the aqueous flow stream to produce a treatment stream, the calcium hypochlorite producing a desired ratio of hypochlorous acid, hypochlorite ions, calcium ions and hydroxide ions when it is introduced into the aqueous flow stream, and the calcium hypochlorite being introduced into the aqueous flow stream so as to produce a treatment stream having a calcium hypochlorite concentration of between about 17.38 and 34.76 ppm and a calcium concentration of between about 7.6 and 15.2 ppm, the introduction of the calcium hypochlorite into the aqueous flow stream being done by means of an apparatus for controllably treating a liquid with a liquid treatment substance, the apparatus including a body having a first portion providing a container-receiving zone and an opening leading into this zone, as well as a second portion having a liquid inlet and a liquid outlet defining a liquid flow path between them, with the zone being in communication with the liquid flow path;

a container for a liquid treatment substance, the container being located in the container-receiving zone and comprising a cylindrical sleeve, an end-piece closing off a first end of the cylindrical sleeve, at least one aperture in the sleeve in proximity to the first end, and seal means between the first end of the sleeve and the aperture, and being movable from an inoperative position in which the seal means seals fluid tightly against the first portion to prevent liquid passing from the flow path into the aperture, to an operative position in which the seal means permits controlled passage of liquid from the flow passage across the seal means into and out of the inside of the sleeve via the aperture in the sleeve, when the container is in its operative position;

at least one water treatment substance tablet comprising calcium hypochlorite as an active agent, inside the container;

bias means inside the body and biassing the first end of the sleeve away from the liquid flow path; and actuating means for displacing the sleeve between the inoperative and operative postions;

adding at least one wetting agent to the flow stream or to the treatment stream; and exposing the plant and crop to the treatment stream.

According to a further aspect of the invention, there is provided a treatment installation for the treatment of plants or crops, the installation including calcium hypochlorite introduction means for introducing calcium hypochlorite into an aqueous flow stream to produce a treatment stream, the calcium hypochlorite producing hypochlorous acid, hypochlorite ions, calcium ions and hydroxyl ions when it is introduced into the aqueous flow stream, an inlet conduit through which in use the aqueous flow stream flows to the calcium hypochlorite introduction means;

an outlet conduit through which in use the treatment stream flows from the calcium hypochlorite introduction means; and outlet means connected to, and in flow communication with, the outlet conduit, for directing the treatment stream into a plant or crop.

The treatment installation may include wetting agent introduction means for introducing a wetting agent into one of the flow stream and the treatment stream. Instead, the aqueous flow stream may be produced from water and the installation may include wetting agent introduction means for introducing a wetting agent into the water.

The calcium hypochlorite introduction means may be an apparatus for controllably treating a liquid with a liquid treatment substance of the type described in the specification of U.S. Pat. No. 4,842,729.

The installation may include flow stream generating means for generating the aqueous flow stream. The generating means may be arranged to produce an aqueous flow stream having a pressure of between about 40–80 psi.

The flow stream generating means may be a pump.

The installation may include a non-return valve upstream of the introduction means and downstream of the flow stream generating means.

The outlet means may be in the form of at least one nozzle, spray head or the like, typically multiple nozzles in a preselected configuration. The or each nozzle, spray head or the like may be located at a distance of about 1–2 m from the calcium hypochlorite introduction means. The nozzles may be ALBUZ mister nozzles which produce a relatively large drop and operate at a generally lower pressure than most other nozzles.

The installation may further include filtering means for filtering the treatment stream.

The invention extends to crop-spraying equipment which includes an apparatus for controllably treating a liquid substance of the type described in the specification of U.S. Pat. No. 4,842,729.

The invention extends, further, to crop-spraying equipment which includes an apparatus for controllably treating a liquid with a liquid treatment substance, the apparatus including a body having a first portion providing a container-receiving zone and an opening leading into this zone, as well as a second portion having a liquid inlet and a liquid outlet defining a liquid flow path between them, with the zone being in communication with the liquid flow path;

a container for a liquid treatment substance, the container being located in the container-receiving zone and comprising a cylindrical sleeve, an end-piece closing off a first end of the cylindrical sleeve, at least one aperture in the sleeve in proximity to the first end, and seal means between the first end of the sleeve and the aperture, and being movable from an inoperative position in which the seal means seals fluid tightly against the first portion to prevent liquid passing from the flow path into the aperture, to an operative position in which the seal means permits passage of liquid from the flow passage across the seal means into and out of the inside of the sleeve via the aperture in the sleeve, when the container is in its operative position;

bias means inside the body and biassing the first end of the sleeve out of the liquid flow path;

actuating means for displacing the sleeve between the inoperative and operative positions;

an inlet conduit through which an aqueous flow stream can flow to the apparatus;

an outlet conduit through which the aqueous flow stream can flow from the apparatus; and nozzle means, in flow communication with the outlet conduit, for spraying the aqueous stream onto a crop.

The liquid inlet may be aligned with the liquid outlet so that the liquid flow path is linear. The zone or chamber may be of elongate cylindrical form, and may extend orthogonally to the liquid flow path. It may be located between the liquid inlet and the liquid outlet.

The chamber and flow path may be circular in cross-section.

The bias means may comprise a spring located inside the body, between the liquid inlet and the liquid outlet and aligned with the chamber. The chamber as well as the chamber extension may have the same diameter.

The other or second end of the cylindrical sleeve of the container may also be closed off with an end-piece. The end-piece at the second end of the sleeve may be fixedly attached to the sleeve. The sleeve and end-pieces may be of plastics material, with the end-piece at the second end of the sleeve being integral with, e.g. welded to, the sleeve. The end-piece may have a larger diameter than the sleeve so that it protrudes radially outwardly from the sleeve. The sleeve may be provided with a plurality of the apertures in proximity to its first end, i.e. it may be foraminous or apertured in proximity to its first end. Its apertured portion may constitute less than half of the total length of the sleeve, and even less than one fifth its total length, e.g. about 5–10% of its length.

The seal means may comprise an O-ring of compressible material located in a circumferential groove in the sleeve. The O-ring may comprise an annular body portion as well as a circumferential lip-like portion extending radially outwardly from the body portion.

The apparatus may include calcium hypochlorite in the form of tablets located one above the other in the basket.

Typically, the ratio of the diameter of the container to its length may be between 1:2 and 1:4, e.g. about 1:3. The apertures may be spaced apart circumferentially, and may be generally square or rectangular, having bottom edges which extend parallel to the first end of the sleeve, i.e. orthogonally to its axis. The apertures may be arranged in a plurality of axially spaced rows, the apertures in one row being located equidistantly from the first end of the sleeve. The row of apertures located closest to the sleeve's first end, may be positioned so that their bottom edges are spaced 0.5 to 2 cm from the base, e.g. about 1 cm. The width of the groove accommodating the seal ring may be between 2 and 5 mm, e.g. about 3 mm.

The actuating means may include a closure member closing off the chamber opening, the closure member comprising a circular cover portion and a peripheral skirt depending from the cover portion, with the skirt adapted to pass around that portion of the body providing the opening to the chamber. The actuating means may also comprise an external screw thread formation on the body around the opening, and a complemental internal screw thread formation on the closure member, the length of the basket being such that it protrudes from the open end of the chamber and abuts against the underside of the cover portion of the closure member.

The apparatus may include seal means located between the screw thread formation on the body portion providing the chamber opening and the free end of the chamber, and adapted to seal fluid tightly against the inner surface of the skirt of the closure member between the internal screw thread formation on the skirt and the cover portion of the closure member. The seal means may comprise a first O-ring of compressible or resilient material, e.g. rubber, located in a circumferential groove in the body, as well as a second O-ring located around the first O-ring within the groove. The second O-ring may be of less resilient material than the first O-ring, e.g. of TEFLON (tradename). In one embodiment, the second O-ring may comprise an annular body portion and a circumferential flange-like portion extending radially outwardly from the body portion. In another embodiment, it may comprise an annular body having a peripheral slit so that, on the chamber being pressurized, air will enter the slit thereby causing the ring body to flare open and seal effectively against the closure member.

Typically, the apparatus as described above will form part of tractor-drawn crop-spraying equipment. However, they can also form part of a hand-held spraying installation. Tractor drawn equipment typically comprises a water tank having a capacity of between about 500 and 2000 litres and a positive pressure pump which is driven from the power take-off of the tractor and which draws water from the tank and distributes it though spray nozzles. The nozzles may be of the type which operate at a pressure of about 60–80 psi and are particularly suitable for use with the apparatus as hereinbefore described. The nozzles will typically have different aperture sizes and will typically be arranged in suitable configurations depending upon the application. The crop-spraying equipment, as is consistent with most commercial equipment in use, typically includes a boom on which the nozzles are mounted. The boom may, for example, be a laterally extending boom so that several rows of crops can be sprayed simultaneously. Instead, it may be a vertical or diagonally arranged spray boom for spraying trees in orchards. Instead of a boom, the crop-spraying equipment may be fitted with vertically mounted sprays or lateral sprays for orchards and optionally with towers to spray an orchard from above. The crop-spraying equipment may, optionally, include an in-line filter to ensure that particles of calcium hypochlorite which may be dislodged from cartridges do not block the nozzle apertures of the crop spraying equipment.

Typically, the wetting agent will be introduced into the water in the tank and the apparatus will be installed between the pump and the spray nozzles or boom.

As it is important to the method of the invention that the crop or plant is fully exposed to the treatment stream, by using nozzles which produce relatively large drops which are carried effectively without substantial loss of hypochlorous acid and then rapidly dispersed on the surface of the plant by the wetting agent. The configuration of the boom and nozzles will be adjusted or selected to suit the requirements of a particular crop or plant so that effective wetting by the treatment stream is achieved.

The combination of calcium with the middle lamella galacturonic pectin structure of plants has long been recognised. Calcium aids the plant in its inherent ability to protect itself from attack by microorganisms by supporting the pectin structure and the physiology of cell metabolism of the outer cuticle. In a plant, calcium is well known and widely described in its function to maintain cell integrity by combining with pectins in what has been described as the "egg box" effect, in which calcium is held in the spaces between two galacturonic acid chains by forming a coordination complex with the hydroxyl oxygens and the galacturonic acid carboxyl group. Because of recognition of the importance of calcium in protecting and fortifying the outer structure of plants, attempts have been made by horticulturists to artificially incorporate calcium into the cell wall structure, i.e. the spraying of plants and products with calcium chloride. These attempts have not met with success.

The Applicant believes that the combination of calcium ions and hydroxide ions in conjunction with hypochlorous acid and hypochlorite ions according to the invention enhances the ability of the plant to absorb and bind calcium ions into its middle lamella. This enhances the ability of the plant cell tissue to retain water and maintain its physiological processes. This is evident in FIG. 14 which shows the maintenance of foliage development under heat stress in potato trials using this epidermal fortification technique. Thereby the plant is enabled to sustain its normal biological functions and overcome attach by micro organisms. Furthermore, if there are lesions on the plant surface, the hypochlorous acid will, by its oxidising nature, immobilise enzymes excreted by the plant at the site of the lesion which in turn will, in the presence of the calcium ions enable the sealing off of the lesion and subsequently create a barrier to infection at the lesion.

Because of time dependent and unwanted side reactions of calcium hypochlorite with the flow stream the method may include adjusting the rate of flow of the flow stream, the rate of introduction of the calcium hypochlorite into the flow stream and locating the spraying means at a predetermined position downstream of the introduction zone so that the treatment stream, having a concentration of about 17.38–34.76 ppm calcium hypochlorite is sprayed onto the plant or crop very shortly after the treatment stream is produced, typically within about 0.29 and 13.4 seconds of production of the treatment stream. This ensures minimal side reactions of the calcium hypochlorite before the treatment solution comes into contact with the plant or crop and ensures that the hydrolysis ionization ratio between hypochlorous acid, hypochlorite ions and calcium hydroxide remains within the desired limits according to the requirements of the invention. For example, when the calcium hypochlorite is introduced into the flow stream by using the apparatus, the nozzles will generally be located at a distance of about 1–3 m downstream of the dispenser when the pressure of the flow stream is between about 40 and 80 psi using a pipe having a diameter of about 1.8 cm.

The method will typically be conducted using an aqueous flow stream having a pH of between about 6.8 and 7.4. This pH range is suitable because of the increase in pH by about 0.2–0.3 caused by the alkalinity of the calcium hydroxide produced when the water makes contact with the calcium hypochlorite. A lower pH also serves to limit the ionization of hypochlorous acid to hypochlorite.

The invention is now described, by way of example, with reference to the accompanying diagrammatic drawings in which FIG. 1 shows a schematic view of a first configuration of a tractor and crop-spraying equipment in accordance with the invention;

FIG. 2 show a schematic view of a second configuration of a tractor and crop-spraying equipment;

FIG. 3 shows a schematic view of a third configuration of a tractor and crop-spraying equipment;

FIG. 4 shows a partly sectioned, exploded, side view of the apparatus;

FIG. 5 shows a partly sectioned side view of the dispenser of FIG. 4 in its assembled state;

FIG. 6 shows a side view of apparatus for controllably treating a liquid with a liquid treatment substance;

FIG. 7 shows a vertical sectional view of the apparatus of FIG. 6;

FIG. 8 shows, in part, an end view of the apparatus of FIG. 6, with details omitted for clarity;

FIG. 9 shows an enlarged view of part of the apparatus shown in FIG. 7, with the upper seal means being in accordance with another embodiment of the invention;

FIG. 10 shows a three-dimensional view of the basket or cartridge of FIG. 7;

FIG. 11 shows, in part, an enlarged side view of the container of FIG. 6, with a portion cut away for clarity;

FIG. 12 shows a similar side view to FIG. 11, of a container according to another embodiment of the invention;

FIG. 13 shows a schematic view of a further configuration of crop-spraying equipment in accordance with the invention;

FIG. 14 is a graph showing the effect of conventional spraying and spraying in accordance with the method of the invention on potato crop foliage development (including the effect of heat stress); and FIG. 15 is a graph showing the effect of conventional spraying and spraying in accordance with the method of the invention on potato tuber weight development.

Referring to FIG. 1, reference numeral 10 schematically indicates crop-spraying equipment being drawn by a tractor 12. The crop-spraying equipment 10 includes a tank 14 mounted on the rear of the tractor 12 and a positive pressure pump or fan blower 16, connected to the power take off (not shown) of the tractor 12, which pumps water from the tank 14 via conduits schematically indicated by the arrows 18, 20, 21 to a set of special spraying nozzles 22 situated on a laterally extending broom 24. An apparatus of the type described in U.S. Pat. No. 4,842,729 26, as described in further detail below is located downstream of the pump 16. A filter 28 is arranged downstream of the apparatus 26.

Referring to FIG. 2, reference numeral 50 schematically indicates a second configuration of crop-spraying equipment being drawn by a tractor 12. The same numbers have been used to indicate the same or similar features of the crop-spraying equipment 50 and 10. The equipment 50 differs from the equipment 10 only in that the pump or fan blower 16 is located between the tractor 12 and the water tank 14 instead of at the back of the water tank 14.

Referring to FIG. 3, reference numeral 60 schematically indicates a third configuration of crop-spraying equipment in accordance with the invention. Again, the same numbers have been used to indicate the same or similar features of the equipment 60 and 10. The equipment 60 differs from the equipment 10 in that the pump or fan blower 16 is located between the tractor 12 and the water tank 14 and the apparatus 26 and filter 28 are located on one side of the tank 14.

In another embodiment of the invention (not shown) a configuration similar to that depicted in FIG. 3 is used in a hand-spray application.

Referring to FIG. 13 reference numeral 300 shows another embodiment of crop-spraying equipment in accordance with the invention. The embodiment 300 includes a tank 302 having a capacity of about 1 000–1 500 l. A feed conduit 304 extends via a centrifugal pump 305 from the tank 302 to a three-way valve 306. The centrifugal pump 305 has an operating pressure of 60–70 psi and a maximum operating pressure of 6 atmospheres (90 psi). An apparatus 26 is located downstream of the three-way valve 306. The conduit 304 leads to three outlet conduits 308, 310, 312. The outlet conduit 308 is connected via a valve 309 to a pair of laterally extending boom sprayers 314, 316, the outlet 310 is connected via a valve 311 to a second set of laterally extending boom sprayers 318, 320 and the outlet 312 is connected via a valve 313 to a third laterally extending set of boom sprayers 322, 324. The boom sprayers are each about 2 m in length and each is provided with six equidistantly spaced spray heads indicated schematically by the black dots in the drawing. In other embodiments (not shown) the boom sprayers are provided with 4 or 5 sprayheads. Each of the pairs of boom sprayers is about 0.5 m apart and the distance between the outer parts of the sprayers 314, 316 and 322, 324 is about 6 m. The nozzles are spaced about 50 cm apart. A further conduit 332 extends from the three-way valve 306 to the tank 302. A low pressure valve 328 is connected to the conduit 332 upstream and downstream of the three-way valve 306 by a conduit 330. In another embodiment of the invention (not shown) two apparatuses 26 are provided in the conduit 304 downstream of the three-way valve 306. A waste outlet conduit 336 extends from the tank 302 and a drainage valve 338 is located in a drainage conduit 340 extending from the conduit 304 downstream of the dispenser 26.

The installation 300 delivers 68 l/hour at a pressure of 28 psi, 83 l/hour at a pressure of 42 psi, 96 l/hour at a pressure of 56 psi, 107 l/hour at a pressure of 70 psi and 118 l/hour at a pressure of 84 psi. The nozzles are ALBUZ Misters which produce a relatively large drop. Where four nozzles are used on each boom, about 3210 l/hour is delivered. At a typical tractor speed of about 5.7 km/h, a spray volume of about 1000 l/hectare is provided. If the tractor speed is increased to about 7.2 km/h about 800 l/hectare is delivered. The booms are located about 25 cm above the plants being sprayed.

In general, the apparatus 26 will be installed in the most practical position between the pump and sprayers. The conduits 18, 20, 21 will typically be about 2.5 cm or about 1.9 cm in diameter.

Figure 5:
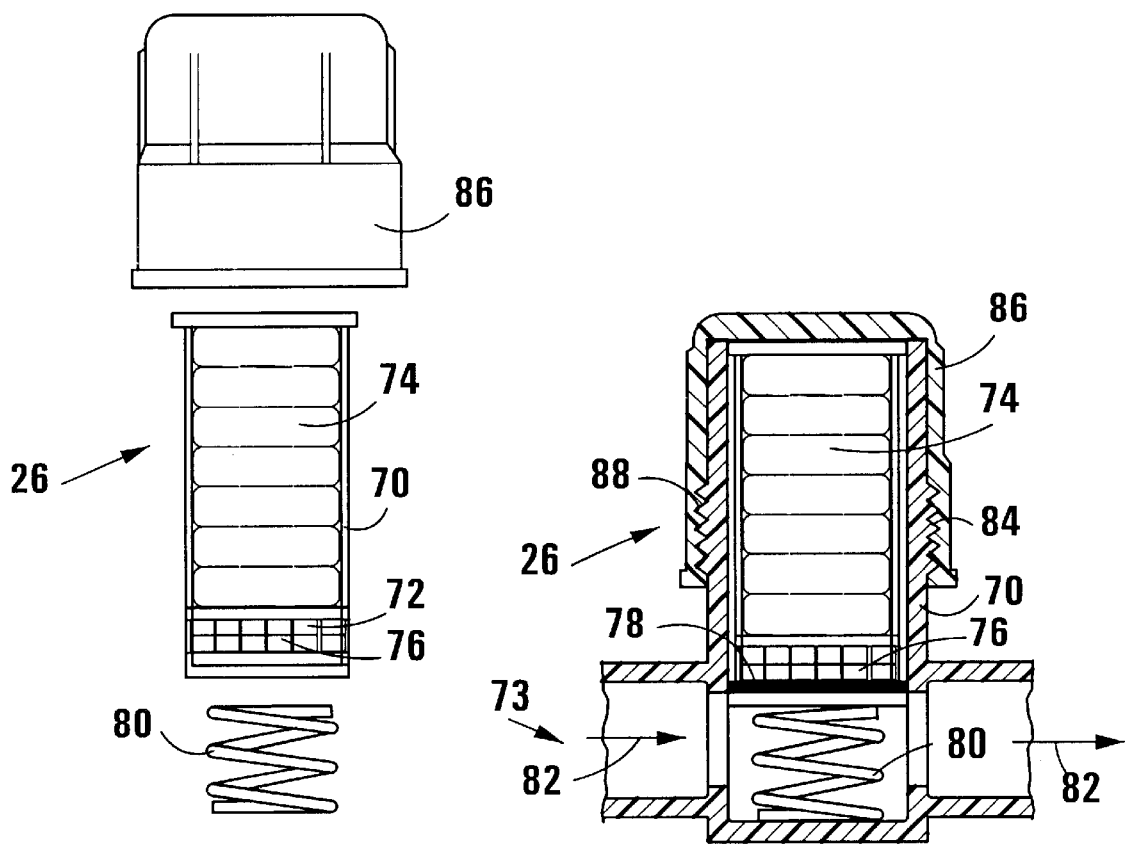
Figure 4:
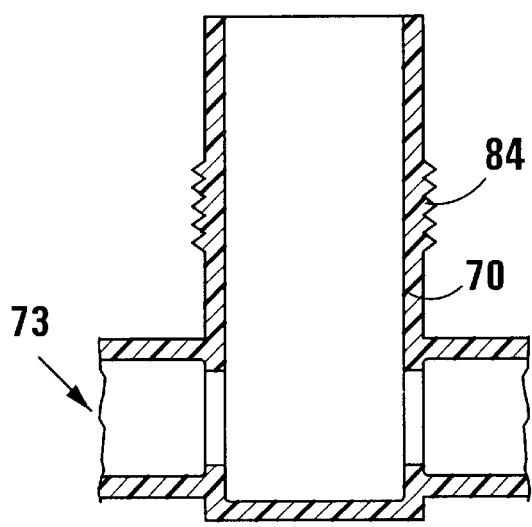

Referring to FIGS. 4 and 5, the apparatus 26 includes an upper cylindrical body portion 70 in which is located a cylindrical basket or cartridge 72 in which calcium hypochlorite tablets 74 are held and a lower cylindrical conduit portion 73. The lower portion of the cartridge 72 is provided with openings 76 and an O-ring 78 provides a seal between the basket 72 and the body portion 70. The cartridge 72 rests on a stainless steel spring 80 as can been seen in particular in FIG. 5, which is located in the flow stream indicated schematically by the arrows 82. The body portion 70 has a circumferentially extending screw thread 84 and the apparatus 26 includes a cap 86 with a complimentary internal screw thread 88 which is engagable with the screw thread 84, as shown in FIG. 5, and serves to adjust the position of the O-ring 78 upwardly and downwardly by compressing and decompressing the spring 80.

In use, the apparatus 26 is adjusted so that the O-ring 78 is located slightly above the flow path 82 of the treatment stream as indicated in FIG. 5. It has been found that this is the optimum position for adequate dosing according to the method of the invention and the standard apparatus 26 does not have to be adjusted when used in the method of the invention. The water turbulence created in the flow stream 82 below the cartridge 72 assists in delivering water past the O-ring 78 and into contact with the calcium hypochlorite tablets 74. Prior art dispensers which are known to the Applicant do not involve O-rings and are unable to deliver a consistent flow stream having the desired concentration of calcium hypochlorite typically of 17.38–34.76 ppm as can the apparatus 26. If the concentration of calcium hypochlorite is not controlled as in the method of the invention concentration surges to above 2 mM of active chlorine equivalent can result in an increased pH in the treatment stream and an increase in hydroxide and sodium chloride concentration which would damage foliage and fruit. Similar results cannot be obtained with sodium hypochlorite because of collapse of the cell walls of the plant caused by sodium ions which displace calcium ions from the cell walls of the plant because the sodium cation is more electropositive than the calcium cation.

Generally, one calcium hypochlorite cartridge contains 700 g of calcium as calcium hypochlorite as active ingredient. Typically, commercial calcium hypochlorite contains about 70% calcium hypochlorite and 30% inert ingredients of which sodium chloride would be the major inert ingredient at 15%. Commercial calcium hypochlorite also contains calcium hydroxide, chlorides, carbonates and chlorates, the balance being water. One cartridge therefore contains 490 000 mg of calcium hypochlorite. Therefore 9 000 l of water flowing through the conduits 18, 20, 21 at a pressure of 60–80 psi would produce a treatment stream of 34.76 ppm calcium hypochlorite.

A more detailed description of an apparatus 110, for use in the invention, for controllably treating or dosing a liquid with a liquid treatment substance, i.e. an inline dispensing or dosing device, is set out below, with reference to FIGS. 7 to 13.

The apparatus 110 includes a T-shaped body, generally indicated by reference numeral 112. The body 112 includes a hollow cylindrical body portion 114, which is circular in cross-section, providing a cylindrical chamber 116. The body portion has, at its free end 115, an opening to the chamber. The body 112 also includes a hollow circular-section cylindrical body portion 118 extending orthogonally to the portion 114 and providing a fluid flow path 120 which is in communication with the chamber 116. The portion 118 has a liquid inlet 122 and a liquid outlet 124, which are aligned linearly with each other.

Inside the chamber 116 there is located a container in the forms of a cylindrical basket, cartridge or magazine 135. The basket 135 comprises a circular-section cylindrical sleeve 136, and circular imperforate end-pieces 138, 140 closing off the respective ends of the sleeve 136. Typically, the components of the basket may be of plastics material, e.g. polystyrene, or the like, and the end-piece 140 may be welded to the sleeve 136. The diameter of the end-piece 140 is greater than that of the sleeve 136 so that it provides a circumferential flange projecting beyond the sleeve 136. Near the end-piece 138, the sleeve 136 is provided with a plurality of apertures 142, i.e. it is foraminous, the calcium hypochlorite tablets 143 are located inside the basket 135, the tablets being located one above the other.

In another embodiment, the end-piece 140 may clip onto the sleeve 136.

A circumferential groove 144 is provided in the sleeve 135 in proximity to the end-piece 138, and in the groove 144 there is located a sealing O-ring 145 of compressible material, e.g. polyethylene, optionally containing a lubricant, e.g. containing 25% EVA. The O-ring 145 comprises an annular body portion 146 from which protrudes radially outwardly from the groove, a circumferential lip-like formation 148. A plurality of protrusions 149 protrude into the inside of the sleeve 136 from the end-piece 138, and they protrude a sufficient distance, e.g. about 1 cm, from the end-piece 138 so that the lowermost tablet (not shown) resting on them is located slightly above the level of the bottommost edges 141 of the row of apertures 142 closest to the end-piece 138. The sleeve is provided with axially extending strengthening ribs 147.

Figure 6:
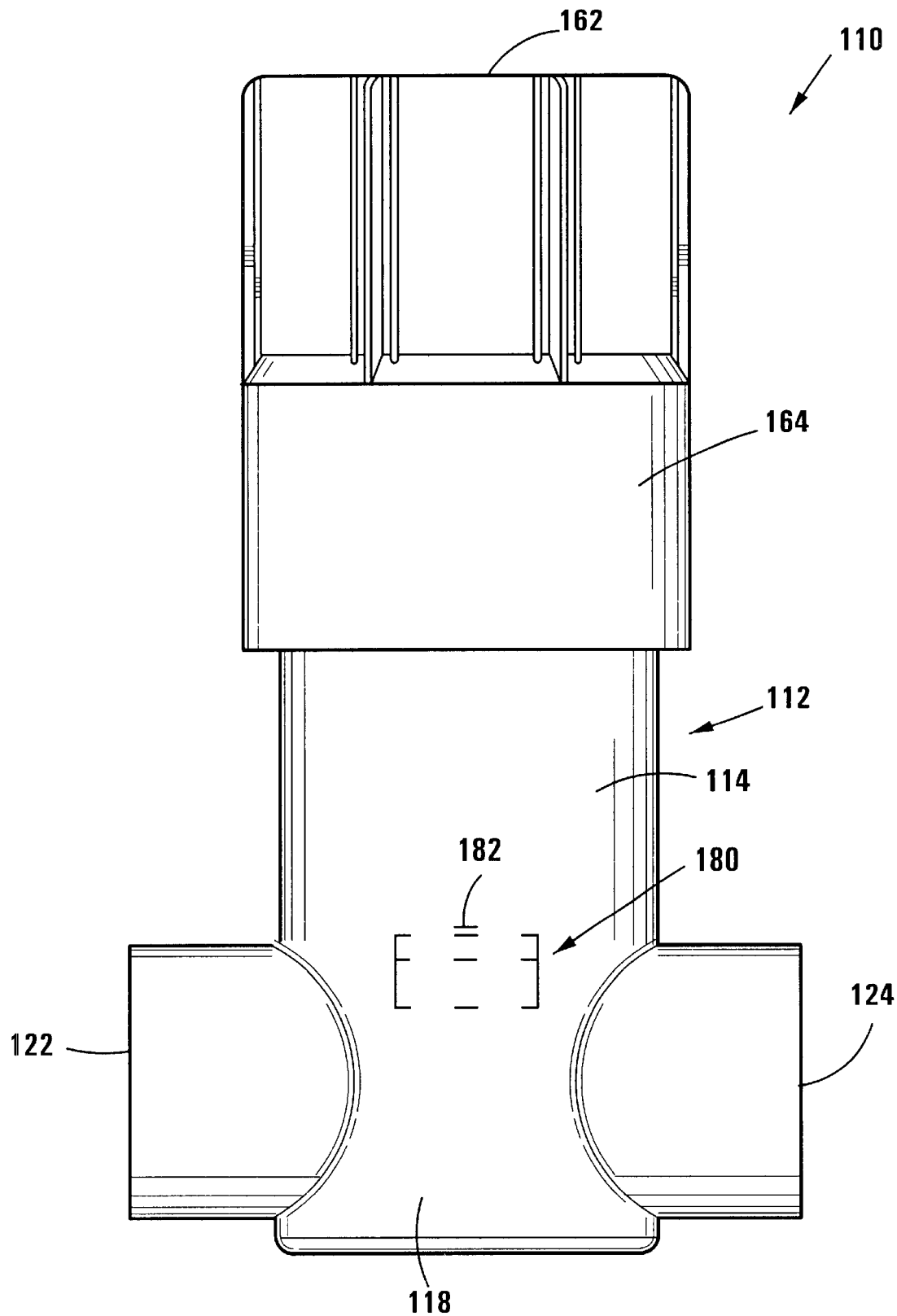
Figure 7:
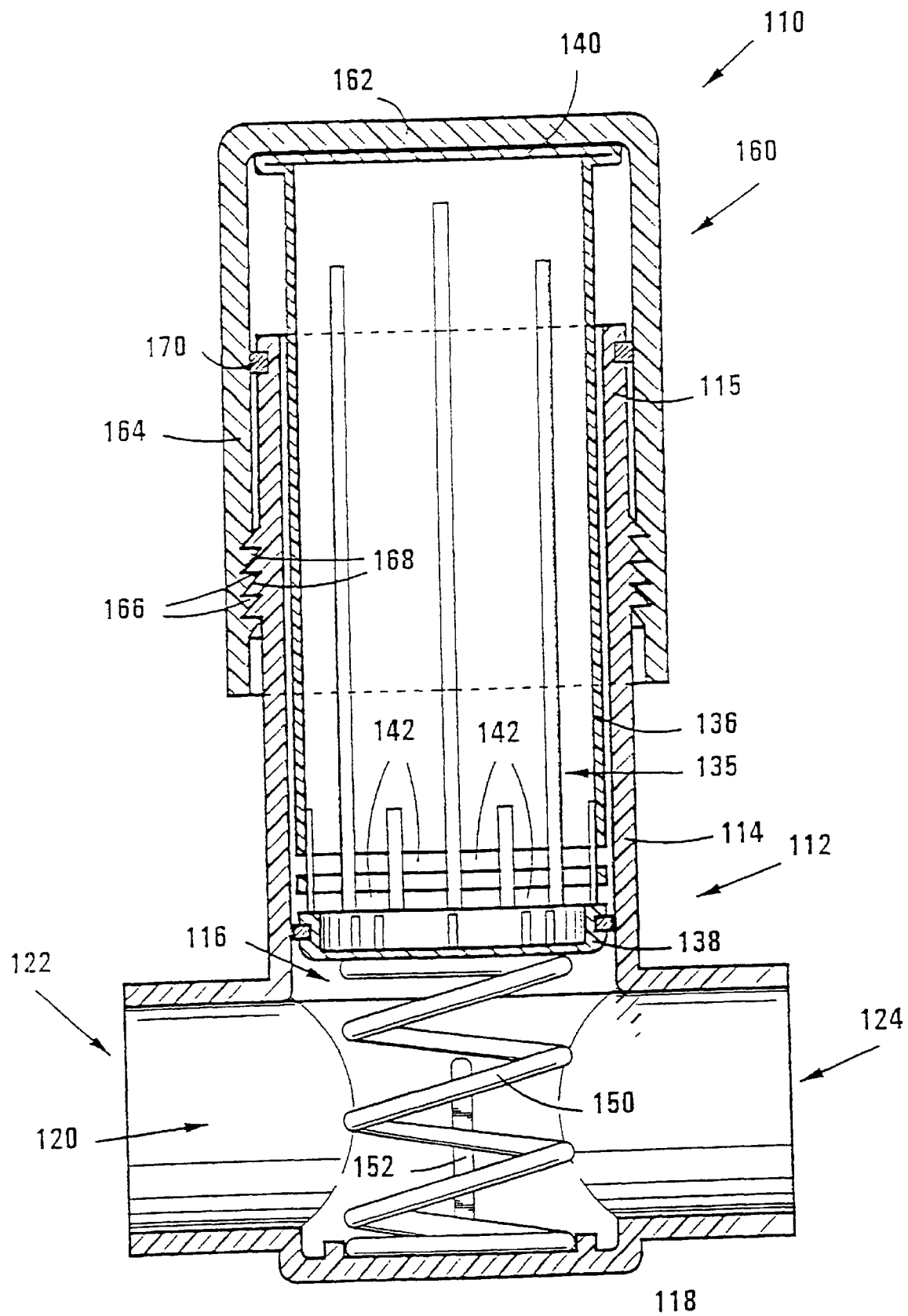
Figure 8:
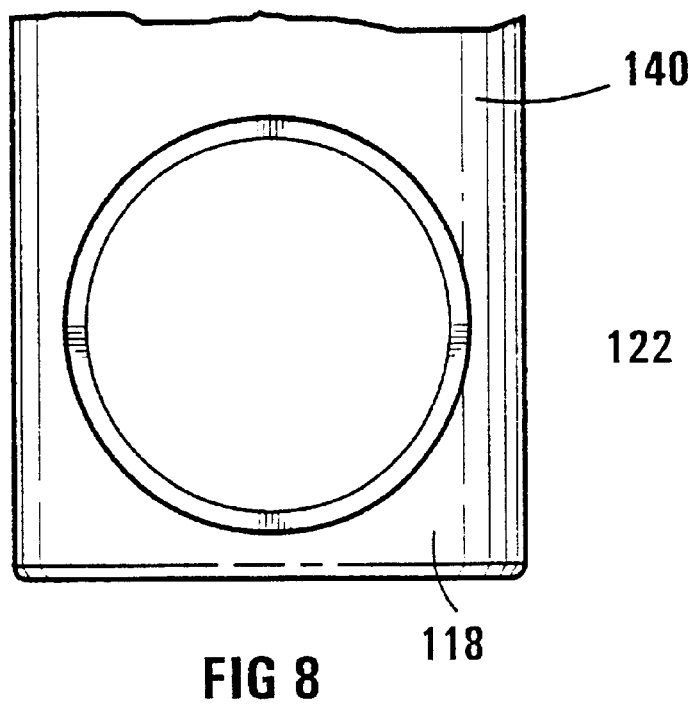

When the basket is then in its inoperative mode as indicated in FIG. 6, the bottommost tablet in the basket will then rest on this supporting member so as to be clear of any liquid in the bottom of the basket. If the bottommost tablet should lie in this liquid, the first volume of liquid dispensed during a subsequent treating mode of operation will have an extraordinarily high concentration of the treatment substance in it. This concentration can cause damage to plants and fundamentally the seal ring 145 embodies the ability of the system to prevent high concentration levels.

The design of the seal ring 145 permits it to act as a one-way valve, i.e. liquid drains from the basket 135 when it is in its inoperative position so that the lowermost tablet does then not rest in the pool of liquid in the bottom of the basket, which would lead to wastage. Without wishing to be bound by theory, the Applicant believes that the functioning of the seal ring 145 to act as a one-way valve is due to a venturi effect created in the flow path 120 and/or due to a slight pressure build-up in the chamber 116 due to decomposition/dissolution of the pills in the container 135.

A spring 150 is located in the portion 118, and abuts against the underside of the end-piece 138. The spring 150 urges the basket 135 out of the flow passage 120. The spring also vibrates because of the water flow. This vibration aids in the movement of calcium particles, thereby preventing clogging of the interface between the seal and body. A pair of stops 152 inside the portion 118 are arranged to engage the undersurface of the end-piece 138 to limit the extent which the basket 135 can protrude into the flow passage 120.

The apparatus 110 also includes a closure member, generally indicated by reference numeral 160. The closure member 160 comprises a circular cover portion 162 and a peripheral skirt 164 depending from the cover portion. The cover portion 164 is provided with an internal screw thread formation 166 which engages a complementary external screw thread formation 168 provided around the body portion 114. Between the screw thread formation 168 and the free end 115 of the body portion 114, there is provided a circumferential groove 170 in which is located a circular section sealing O-ring 172 of resiliently compressible polymeric material, e.g. rubber. Also located within the groove 170 is an O-ring 174 comprising a ring-like or annular body portion 175. The ring 174 may be of a less resilient polymeric material, e.g. TEFLON.

Figure 9:
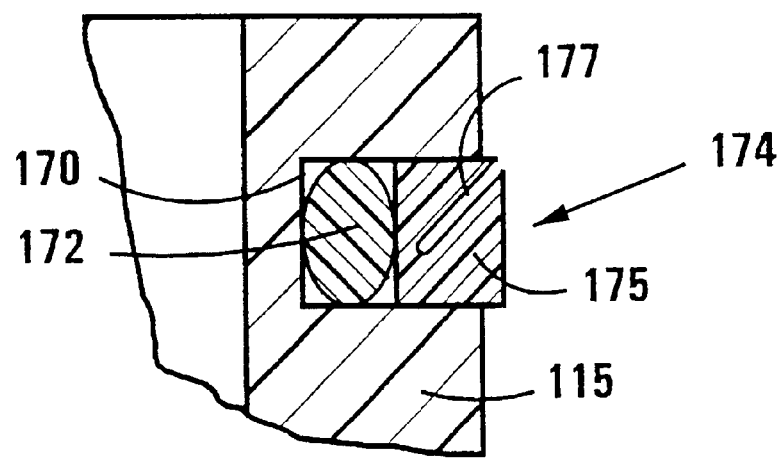
Figure 13:
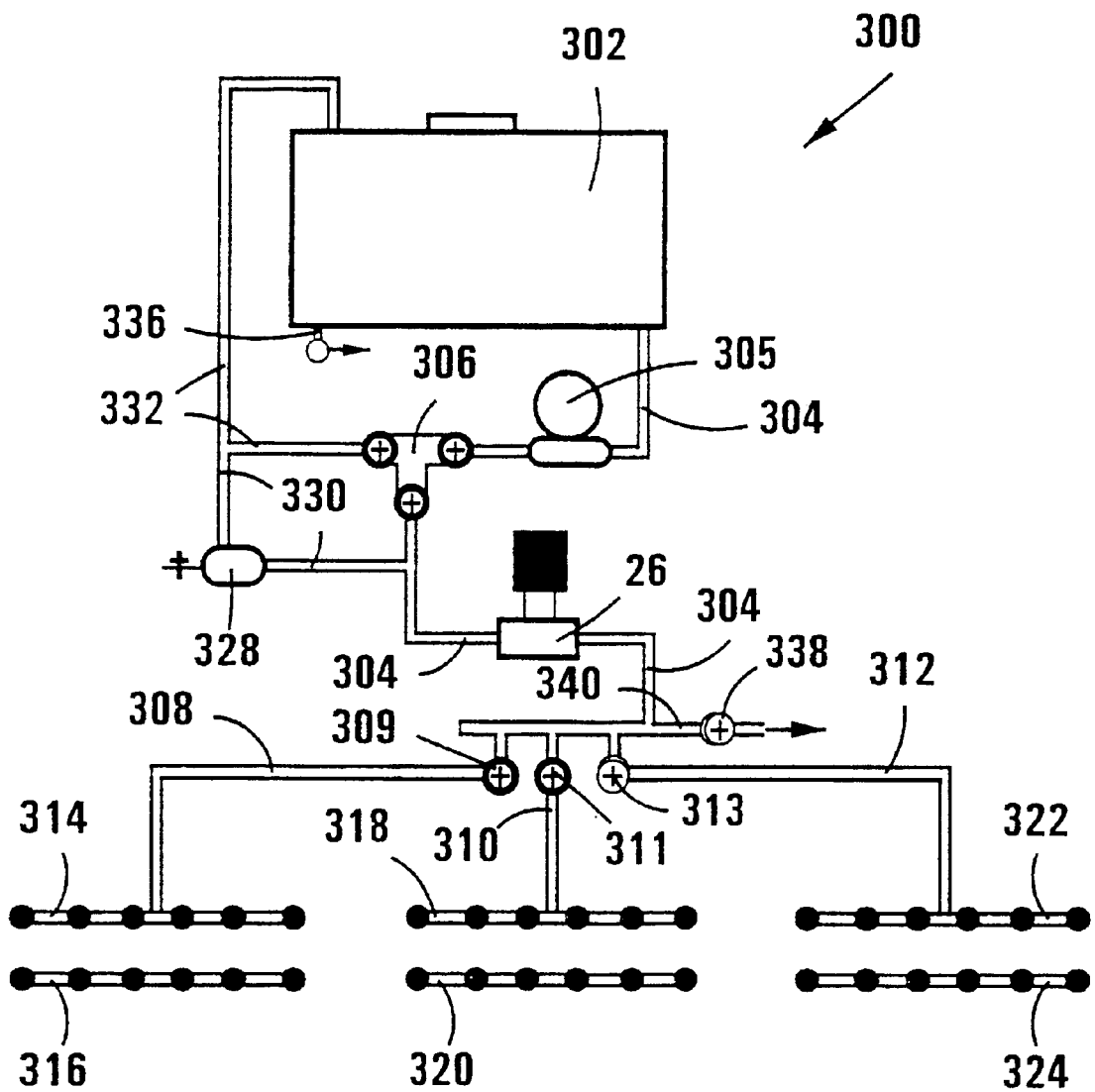

In FIG. 9, it will be seen that, in another embodiment of the invention, the O-ring 174 can comprise only a body portion 175, in which is provided an annular slit or cut 177. In use, pressure air will enter the slit thereby causing the body to expand and seal effectively against the skirt 164.

In the embodiment 200 depicted in FIG. 12, a groove is provided below the apertures 142 and an O-ring 202 is located in the groove.

In use, the basket 135, with the calcium hypochlorite tablets located therein, is inserted into the cylindrical chamber 116 until it abuts against the spring 150. The closure member 160 is then screwed onto the body portion 114, and is screwed onto the body portion 114 against the bias of the spring 150.

A slip stream of liquid hence passes from the flow path 120, across the seal ring 145, into and out of the basket 135 via the apertures 142, back across the seal ring 145, and back into the flow path.

In practice the Applicant has found that low dosing levels can be achieved if the seal ring 145 is positioned immediately, e.g. 1 to 5 mm, above the fluid flow path 120. Without wishing to be bound by theory, the Applicant believes that this is due to the slipstream of water deforming the seal ring 145 sufficiently to pass across it. The seal ring 145 is believed to function as a one-way valve to permit the liquid to pass back into the flow path, as hereinbefore described.

To monitor the degree of dosing, a dosage indicator device 180 is provided, e.g. inscribed on the outside of the body portion 114. The body can hence be of transparent material, e.g. an acrylic material. When the seal ring lip 147, which can be coloured so as to be clearly visible, is located opposite an upper limit marking 182, the basket is in its retracted position, as shown in FIG. 6, i.e. no dosing is effected. The seal ring 145 then prevents any liquid flowing along the flow path 120 from passing into the basket. When the seal ring lip 147 is located just below the upper marking 182, a low level of dosing is nevertheless achieved, as described hereinbefore. This is the position which would be used in crop spraying.

The apparatus 110 can be installed in a water flow line e.g. of a crop-spraying installation with a stop-cock upstream of the apparatus.

To remove a spent basket 135, e.g. to replace it with a basket containing fresh supply of tablets, the stop-cock need merely be closed and the closure member 160 unscrewed. Hence, the apparatus 110 can be reloaded easily and quickly. Depending upon plant growth and tractor speed one basket, or cartridge, would be used on about 5 hectares of crop.

The device 110 can hence also easily be cleaned, e.g. if it is used to dose dirty water and/or if the chemical substance of the tablets leaves a residue or sludge, merely by removing the cartridge.

Typically the basket 135 can have the following approximate dimensions:

| | |
|---|---|
| diameter | 6 cm |
| length | 15 cm |
| sizes of apertures 42 | 0.5 × 1 cm |
| width of the seal ring 45 | 3 mm |
| distance of bottommost edges 141 of bottommost apertures 142 from end piece 138 | 1 cm |

DISCUSSION

The Applicant believes that parasites are unable to attack a living plant unless the attack is made possible via cells which have been compromised through physical or other damage or calcium deficiency in the middle lamella. Such localised lesions or areas of damage or calcium deficient middle lamella would provide an initiation point for the parasite to attack the plant. In the case of a crop, such areas of damage can be caused, for example, by hail, by the chafing of the stem or leaves of the plant against support trellises, by wind damage, by damage brought about by insects such as beetles or snails or any other cause which can bring about damage to the outer protective epidermal cuticle of the plant. The Applicant believes that, unless the natural physiological defence mechanisms of the plant are capable, by formation of protective dead cell tissue, to arrest and isolate the damage, the cell and ultimately the plant will be open to attack by parasites.

Thus, the spraying of crops in accordance with the method of the invention differs from conventional spraying using pesticides in that the latter is generally carried out with the intention of maintaining a residual presence of the pesticide on the plant surface with the explicit purpose of killing microorganisms. The spraying of crops in accordance with the method of the invention is not directed at organisms, but is applied for the purpose of mending lesions in the plant and enabling the plant to fortify its entire outer surface by calcium incorporation.

Thus, where a plant disease such as *Phytophthera infestans* or Late Blight or *Alternaria solani* or Early Blight in potatoes has been classified as an organism which is capable of penetrating the protective epidermal cuticle for example of a potato plant, it is the Applicant's belief that these organisms Phytophthera and Alternaria only attack the potato plant if there has been some form of physical damage or lesion or calcium deficiency to the plant. The Applicant believes that treatment of the plant with the hydrolysis products of calcium hypochlorite as hereinbefore described has the effect of healing the wound or lesion by immobilising enzymes such as amylase such as for example starch degrading amylase in drying lesions, and the polyphenol oxidase/peroxidase action can be immobilised in arresting necrotic browning reactions. Mending of lesions would deny these rot organisms such as Phytophthera and Alternaria access to the plant cell. This has been shown in the protection of plant cell walls as set out in FIGS. 14 and 15 which are discussed below. Fortuitously, during the trials which produced the results set out in FIGS. 14 and 15 extreme heat was encountered, and the figures show both recovery of foliage, hence enhanced physiology and the production of tubers.

Figure 14:
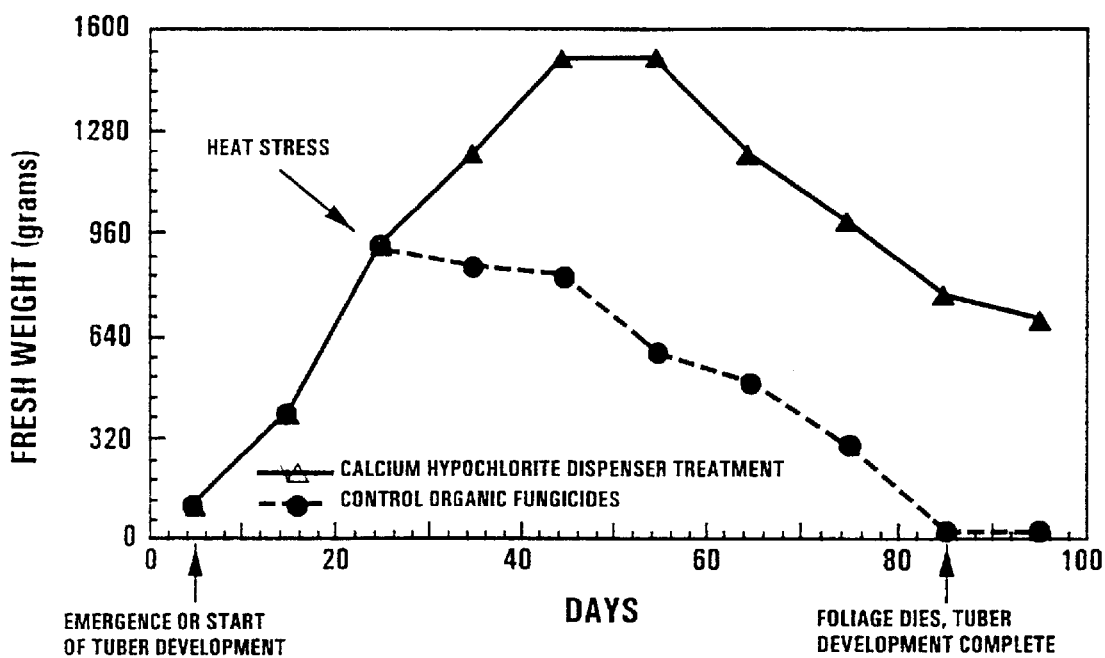
Figure 15:
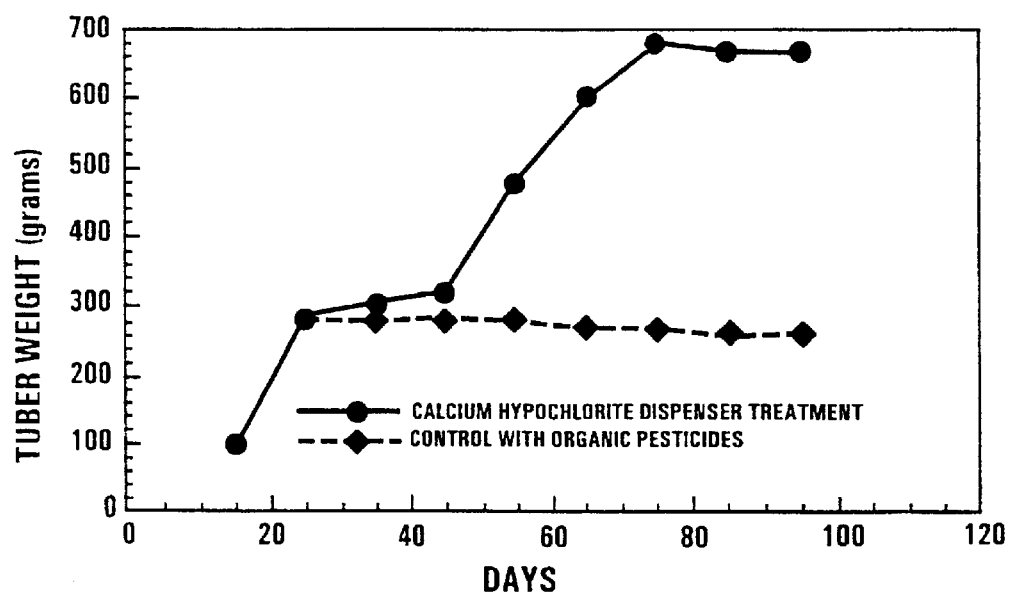

The protection of plant cell walls by spraying with calcium hypochlorite is shown in the results of a trial conducted on a potato crop in the Negev Desert in Israel using conventional sprays and using the method of the invention as set out in Table 1 and in FIGS. 14 and 15.

TABLE 1

Field Experiment Result on sandy soil in Negev Israel
(Statistical Analysis by Duncan Test). Variety Ratte,
5 plant/m, ridge size 95 cm, irrigation 100–120%
evaporation.

| Yield Tubers $Kg/M_2$ | Tuber weight in grams | | | Early Blight % infection in leaves |
|---|---|---|---|---|
| | Less than 60 g | More than 60 g | Total | |
| Treatment without Chlorine* | 0.86 | 0.63 | 1.49 | 91.2 |
| Treatment with chlorine** | 0.42 | 3.25 | 3.67 | 34.5 |

*Treament: 5 sprays of surface fungicides, 2 sprays of systemic against Early Blight, and 2 sprays of insecticide against Potato Tuber Moth.
**Calcium hypochlorite spray once a week at 1000 l/hectare of 17.38–34.76 ppm. First chlorine spray 20 days after planting. Spray water in tank adjusted to pH 7 with phosphoric acid, and 0.01% wetting agent. Sprayed also 2 sprays for Potato Tuber Moth and a systemic fungicide spray, which is considered opitional.

The hydrolysis products of calcium hypochlorite, as for the control of Phytophthera and Alternaria diseases of potatoes, is not-restricted to potatoes and can be applied for example to rot organisms such as Botrytis, Mucor, Penicillium, Alternaria and many other fungi to prevent these organisms from gaining access to the plant cell and thereby gaining a foothold on the plant foliage or fruit.

Calcium hypochlorite, sprayed at 1000 to 1500 ∫, can be applied for cell wall protection of not only potatoes, but for all cucurbits, vineyards, citrus, leafy vegetables, the berry family and any other plant which is susceptible to rot disease attack. The only variable in these cases would be the density of foliage, and hence the configuration of spray equipment used in order to attain maximum and complete wetting of the plant for calcium and hypochlorous acid ions to establish an interface of action and absorption through the cell wall.

It is an advantage of the invention illustrated by experimental success that the method and installation of the invention allows even difficult to manage plants such as potatoes in which *Phytophera infestans* attacks both the foliage and the tuber to be effectively treated. The wetting agent brings about effective contact between the plant surface and the treatment stream so that effective contact of the hypochlorous acid, which has only a fleeting existence, with the plant surface is also assured. The Applicant has also found, surprisingly, by the experimentation that effective absorption of calcium by the plant takes place if the concentration of calcium in the treatment stream is similar to the physiological molar concentration of calcium in the plant which is of the order of 10 mM. At 10 mM, the cell wall calcium structure is in or near equilibrium at all times. Establishment of a complete equilibrium of both fixed and soluble cell calcium can be effected by supplementation of physiological quantities of calcium therefore the invention ideally uses concentrations of about 7.6–15.2 ppm calcium. This is an advantage over prior art methods of applying calcium in the form of the chloride, nitrate or chelate to plants known to the Applicant which use substantially larger concentrations of calcium and which have largely been found to be ineffective. Without being bound by theory the Applicant believes that the extremely strong undisassociated oxidising agent, hypochlorous acid, and the negatively charged hypochlorite ion create an electric potential across the outer cuticle allowing the absorption and binding of calcium ions within the middle lamella structure. Such incorporation of calcium has not been described before.

It is a further advantage of the invention illustrated that calcium hypochlorite is considerably cheaper than fungicides which have previously been used. The Applicant has found that the cost associated with the method of the invention is only one fifth of that associated with the use of pesticides in pre-harvest applications. The Applicant, as shown in the Table and Figures, has found that a substantial increase in production, in excess of 30% and, in some cases, of the order of 100%, can be obtained when a potato crop is treated in accordance with the method of the invention. The invention is, however, also effective on many other crops, particularly leafy vegetables and lettuce, as described earlier. The trials conducted on potatoes emphasize the efficacy of the invention because Phytophthera is a virulent organism in attacking both foliage and tubers and can also colonise the soil. It is a further advantage of the invention illustrated that the calcium which is present in the treatment stream is, in part, absorbed by the plant where it serves the purpose of protecting the middle lamella of the plant.

It is a further advantage of the invention illustrated that calcium hypochlorite has been approved by the EPA (40 CFR 180.1054) of the USA for use on agricultural products free of chemical residue. As the use of calcium hypochlorite is approved free of chemical residue by the EPA, this method can also be used on the day of harvest to remove pesticide residues on crops if necessary. Prior art methods which leave pesticide residues on the plants generally cannot be used less than 1–2 weeks before harvest because of the dangers associated with the presence of pesticide residues on the plant. If a crop has a pesticide residue which is too high it may result in the crop being either not commercially marketable or even having to be destroyed. It is particular advantage of the invention illustrated that the method of the invention is an alternative to the use of organic pesticides without addressing the killing of the relevant organisms. This also eliminates the problems associated with water run-off and seepage of pesticides into underground water systems.

What is claimed is:

1. A method of treating a plant or crop, comprising exposing the plant or crop to an aqueous treatment stream comprising at least one wetting agent and calcium hypochlorite in which exposing the plant or crop to the aqueous treatment stream comprises:

generating an aqueous flow stream from water;

introducing calcium hypochlorite into the aqueous flow stream to produce the treatment stream, the calcium hypochlorite producing hypochlorous acid, hypochlorite ions, calcium ions and hydroxyl ions when it is introduced into the aqueous flow stream, and the calcium hypochlorite being introduced into the flow stream so that the treatment stream has a calcium hypochlorite concentration of between about 17.38 and 34.76 ppm and a calcium ion concentration of between about 7.6 and 15.2 ppm, the velocity of the aqueous flow stream being selected so that the treatment stream reaches the plant or crop within about 0.29–13.4 seconds after the calcium hypochlorite has been introduced into the aqueous flow stream;

adding the or each wetting agent optionally to the water from which the flow stream is generated or to the flow stream or to the treatment stream; and exposing the plant or crop to the treatment stream.

2. A method as claimed in claim 1, in which the calcium hypochlorite is introduced into the aqueous flow stream so as to produce a treatment stream having a calcium hypochlorite concentration of between about 22.88 and 27.44 ppm.

3. A method as claimed in claim 2, in which the calcium hypochlorite is introduced into the aqueous flow stream so as to produce a treatment stream having a calcium concentration of between about 10 and 12 ppm.

4. The method as claimed in claim 1 in which the plant or crop is a growing crop.

5. The method as claimed in claim 4, in which the crop is selected from potatoes, stone fruit, apples, vines, onions, cucurbits, leafy vegetables and flowers.

6. The method as claimed in claim 1, in which the wetting agent is a silicone polyether wetting agent.

7. The method as claimed in claim 6, in which the silicone polyether wetting agent is a silicone polyether copolymer and alcohol ethoxylate.

8. The method as claimed in claim 1, in which the aqueous medium includes 0.005 to 0.05% of the wetting agent.

9. The method as claimed in claim 8, in which the aqueous medium includes about 0.01% of the wetting agent.

10. The method as claimed in claim 1, in which exposing the plant or crop to the aqueous medium comprises spraying the aqueous medium onto the plant or crop.

11. A method of treating a plant or crop the method comprising:

generating an aqueous flow stream from a source of water;

introducing calcium hypochlorite into the aqueous flow stream to produce a treatment stream, the calcium hypochlorite producing hypochlorous acid, hypochlorite ions, calcium ions and hydroxyl ions when it is introduced into the aqueous flow stream, and the calcium hypochlorite being introduced into the aqueous flow stream so as to produce a treatment stream having a calcium hypochlorite concentration of between about 17.38 and 34.76 ppm and a calcium concentration of between about 7.6 and 15.2 ppm, the introduction of the calcium hypochlorite into the aqueous flow stream being done by means of an apparatus for controllably treating a liquid with a liquid treatment substance, the velocity of the aqueous flow stream being selected so that the treatment stream reaches the plant or crop within about 0.29–13.4 seconds after the calcium hypochlorite has been introduced into the aqueous flow stream, the apparatus comprising a body having a first portion providing a container-receiving zone and an opening leading into this zone, as well as a second portion having a liquid inlet and a liquid outlet defining a liquid flow path between them, with the zone being in communication with the liquid flow path;

a container for a liquid treatment substance, the container being located in the container-receiving zone and comprising a cylindrical sleeve, an end-piece closing off a first end of the cylindrical sleeve, at least one aperture in the sleeve in proximity to the first end, and seal means between the first end of the sleeve and the aperture, and being movable from an inoperative position in which the seal means seals fluid tightly against the first portion to prevent liquid passing from the flow path into the aperture, to an operative position in which the seal means permits controlled passage of liquid from the flow passage across the seal means into and out of the inside of the sleeve via the aperture in the sleeve, when the container is in its operative position;

at least one water treatment substance tablet comprising calcium hypochlorite as an active treatment substance inside the container;

bias means inside the body and biasing the first end of the sleeve away from the liquid flow path; and actuating means for displacing the sleeve between the inoperative and operative positions;

adding at least one wetting agent optionally to the flow stream or to the treatment stream; and exposing the plant or crop to the treatment stream.

12. Crop spraying equipment for the treatment of plants or crops, the installation comprising:

calcium hypochlorite introduction means for introducing calcium hypochlorite into an aqueous flow stream to produce a treatment stream, the calcium hypochlorite producing hypochlorous acid, hypochlorite ions, calcium ions and hydroxyl ions when it is introduced into the aqueous flow stream, the calcium hypochlorite being introduced into the flow stream so that the treatment stream has a calcium hypochlorite concentration of between about 17.38 ppm and 34.76 ppm and a calcium ion concentration of between about 7.6 ppm and 15.2 ppm;

an inlet conduit through which in use the aqueous flow stream flows to the calcium hypochlorite introduction means;

an outlet conduit through which in use the treatment stream flows from the calcium hypochlorite introduction means;

outlet means connected to, and in flow communication with, the outlet conduit, for directing the treatment stream onto a plant or crop, the outlet means being selected from nozzles and spray heads, the or each nozzle or spray head being located at a distance of about 1–2 m from the calcium hypochlorite introduction means; and flow generating means operable to generate a flow rate such that the treatment stream reaches the outlet means within about 0.29–13.4 seconds after the calcium hypochlorite has been introduced into the aqueous flow stream.

13. Crop spraying equipment as claimed in claim 12, which includes wetting agent introduction means for introducing a wetting agent into one of the flow stream and the treatment stream.

14. Crop spraying equipment as claimed in claim 12, in which the aqueous flow stream is produced from water and in which the installation includes wetting agent introduction means for introducing a wetting agent into the water.

15. Crop spraying equipment as claimed in claim 12, in which the calcium hypochlorite introduction means is an apparatus for controllably treating a liquid with a liquid treatment substance, the apparatus including a body having a first portion providing a container-receiving zone and an opening leading into this zone, as well as a second portion having a liquid inlet and a liquid outlet defining a liquid flow path between them, with the zone being in communication with the liquid flow path;

a container for a liquid treatment substance, the container being located in the container-receiving zone and comprising a cylindrical sleeve, an end-piece closing off a first end of the cylindrical sleeve, at least one aperture in the sleeve in proximity to the first end, and seal means between the first end of the sleeve and the aperture, and being movable from an inoperative position in which the seal means seals fluid tightly against the first portion to prevent liquid passing from the flow path into the aperture, to an operative position in which the seal means permits controlled passage of liquid from the flow passage across the seal means into and out of the inside of the sleeve via the aperture in the sleeve, when the container is in its operative position;

bias means inside the body and biassing the first end of the sleeve away from the liquid flow path;

actuating means for displacing the sleeve between the inoperative and operative positions.

16. Crop spraying equipment as claimed in claim 12, comprising a non-return valve upstream of the calcium hypochlorite introduction means and downstream of the flow stream generating means.

17. Crop spraying equipment as claimed in claim 12, which further comprises filtering means for filtering the treatment stream.

18. A method of treating a plant or crop, comprising exposing the plant or crop to an aqueous treatment stream comprising at least one wetting agent and calcium hypochlorite in which exposing the plant or crop to the aqueous treatment stream comprises:

generating an aqueous flow stream from water;

introducing calcium hypochlorite into the aqueous flow stream to produce the treatment stream, the calcium hypochlorite producing hypochlorous acid, hypochlorite ions, calcium ions and hydroxyl ions when it is introduced into the aqueous flow stream, and the calcium hypochlorite being introduced into the flow stream so that the treatment stream has a calcium hypochlorite concentration of between about 17.38 and 34.76 ppm and a calcium ion concentration of between about 7.6 and 15.2 ppm, the velocity of the aqueous flow stream being selected so that the treatment stream reaches the plant or crop before substantial breakdown of the hypocholorous acid;

adding the or each wetting agent optionally to the water from which the flow stream is generated or to the flow stream or to the treatment stream; and exposing the plant or crop to the treatment stream.

* * * * *

UNITED STATES PATENT AND TRADEMARK OFFICE
CERTIFICATE OF CORRECTION

PATENT NO.    : 6,564,508 B1
DATED         : May 20, 2003
INVENTOR(S)   : Buchan It is certified that error appears in the above-identified patent and that said Letters Patent is hereby corrected as shown below:

Column 1,
Line 48, "17.38-34.76 ppm" should read -- 27.17-54.33 ppm --
Lines 58-59, "17.38 and 34.76 ppm" should read -- 27.17 and 54.33 ppm --

Column 2,
Line 6, "17.38 and 34.76 ppm" should read -- 27.17 and 54.33 ppm --
Line 15, "22,88 and 27.44 ppm" should read -- 35.75-42.89 ppm --

Column 3,
Line 29, "17.38 and 34.76 ppm" should read -- 27.17 and 54.33 ppm --

Column 7,
Line 38, "17.38-34.76 ppm" should read -- 27.17-54.33 ppm --

Column 10,
Line 6, "17.38-34.76 ppm" should read -- 27.17-54.33 ppm --
Line 29, "34.76 ppm" should read -- 54.33 ppm --

Column 13,
Footnote of Table 1, "17.38-34.76 ppm" should read-- 27.17-54.33 ppm --
Footnote of Table 1, "opitional" should read -- optional --
Line 66, "not-restricted" should read -- not restricted --

Column 15,
Lines 28-29, "17.38 and 34.76 ppm" should read-- 27.17 and 54.33 ppm --
Line 42, "22.88 and 27.44 ppm" should read -- 35.75-42.89 ppm --

Column 16,
Line 8, "17.38 and 34.76 ppm" should read-- 27.17 and 54.33 ppm --
Lines 59-60, "17.38 and 34.76 ppm" should read-- 27.17 ppm and 54.33 ppm --

UNITED STATES PATENT AND TRADEMARK OFFICE
CERTIFICATE OF CORRECTION

PATENT NO. : 6,564,508 B1
DATED : May 20, 2003
INVENTOR(S) : Buchan

It is certified that error appears in the above-identified patent and that said Letters Patent is hereby corrected as shown below:

Column 18,
Lines 29-30, "17.38 and 34.76 ppm" should read-- 27.17 ppm and 54.33 ppm --

Signed and Sealed this

Seventh Day of September, 2004

JON W. DUDAS
*Director of the United States Patent and Trademark Office*